United States Patent
Satchell, Jr.

(10) Patent No.: US 6,200,522 B1
(45) Date of Patent: Mar. 13, 2001

(54) METHOD AND APPARATUS FOR SMELTING IRON ORE

(75) Inventor: Donald Prentice Satchell, Jr., Berkeley Heights, NJ (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/524,966

(22) Filed: Mar. 14, 2000

Related U.S. Application Data

(62) Division of application No. 09/040,078, filed on Mar. 17, 1998, now Pat. No. 6,053,961.

(51) Int. Cl.$^7$ .................................................. C21B 11/02

(52) U.S. Cl. ............................................. 266/197; 266/171

(58) Field of Search ...................................... 266/171, 160, 266/177, 197; 75/448, 452, 958

(56) References Cited

U.S. PATENT DOCUMENTS

| | | | |
|---|---|---|---|
| 5,431,710 | * 7/1995 | Ebenfelt | 75/443 |
| 5,529,599 | * 6/1996 | Calderon | 75/10.63 |
| 5,613,997 | * 3/1997 | Satchell, Jr. | 75/414 |
| 6,053,961 | * 4/2000 | Satchell, Jr. | 75/448 |

\* cited by examiner

*Primary Examiner*—Scott Kastler
(74) *Attorney, Agent, or Firm*—Salvatore P. Pace

(57) ABSTRACT

Method and apparatus for smelting iron ore in which iron ore is preheated and partly reduced within a first reaction zone and then further reduced in a second reaction zone. The first reaction zone can be a shaft reduction furnace and the second reaction zone can be a melter gasifier. An auxiliary third reaction zone partially oxidizes a carbonaceous material to produce char for the third reaction zone. A reducing gas produced by partial oxidation of the char is used to effect the partial reduction conducted within the first reaction zone. Volatile substances contained within a heating gas produced by the partial oxidation within the auxiliary third reaction zone is further oxidized and used to preheat the iron ore within the first reaction zone.

7 Claims, 1 Drawing Sheet

METHOD AND APPARATUS FOR SMELTING IRON ORE

RELATED APPLICATIONS

This is a divisional application of U.S. Ser. No. 09/040,078 filed Mar. 17, 1998 now U.S. Pat. No. 6,053,961.

BACKGROUND OF THE INVENTION

The present invention relates to a method and apparatus for smelting iron ore in which the iron ore is preheated and partly reduced within a first reaction zone and then further reduced and melted in a second reaction zone to produce a molten iron product. More particularly, the present invention relates to such a method and apparatus in which a carbonaceous feed is heated within a third reaction zone to produce hot char that is fed into the second reaction zone together with an oxidant. Even more particularly, the present invention relates to such a method and apparatus in which evolved volatile substances produced during char production are oxidized to produce a heating gas that is introduced into the first reaction zone in order to preheat the iron ore.

Coal is generally the most common and cost-effective carbonaceous material for the production of iron. A blast furnace is, by far, the most common, thermally efficient, and best established method to use coal to produce molten iron. However, appropriate coal must first be converted to metallurgical coke in a coke oven prior to introduction into the blast furnace. There are two practical problems with this approach. One problem is that an appropriate coal may be unavailable or prohibitively expensive in some parts of the world. A more serious problem is that toxic liquid and fugitive gas products are emitted from the coke plant that can cause significant environmental issues. As a result, there has been a world wide effort to develop coal-based iron production processes that can use coal directly to produce iron with substantially reduced gaseous or liquid pollutant emissions.

These coal-based iron production processes generally have two reaction zones. A first reaction zone preheats and partially reduces the ore. A second reaction zone contacts coal with an oxidant, usually substantially pure oxygen, to reduce and melt iron, slag, and produce a reducing gas, which is fed to the first reaction zone to effect the partial reduction of the ore. Hydrogen and CO are the active components for this reducing gas. There are, at least, a half dozen coal-based iron production processes under development that conform to the above generic process description and have unique features within this framework. The COREX process, developed by Vorst Alpine Industrieanlagenbau GmbH is the only fully commercialized coal-based iron production process.

As a group, these coal-based processes are less thermally efficient than the conventional blast furnace process for iron production. The thermal efficiency of these coal-based processes are primarily limited by the performance of the second stage. The second stage has two functions: compete reduction of the iron oxide ore to elemental iron and melt the iron and slag products. Iron ore reduction and melting is highly endothermic. The energy required for this reduction is most cost-effectively supplied by partial oxidation of coal. However, in order to produce molten iron, the $CO/CO_2$ and $H_2/H_2O$ molar ratios must be very high, on the order of 20/1. On the other hand, oxidation of carbon to $CO_2$ provides roughly four times the energy of oxidation carbon to CO. Worse yet, $H_2$ production from coal is highly endothermic. As a result, there have been numerous attempts to minimize the hydrogen content of the coal feed and use the energy of oxidation of carbon to $CO_2$ without oxidizing the iron product.

U.S Pat. No. 5,613,997 discloses a technique to increase the thermal efficiency of the second reaction zone of a generic coal-based iron ore production processes based on the fact that coal has three broad classifications of components: volatile matter, fixed carbon, and ash. The ash is an undesirable component that should be minimized through the coal selection process. The volatile matter is a class of hydrocarbons that contains most of the hydrogen in the coal. The fixed carbon is a class of hydrocarbons that contains the highest concentration of carbon and is the most desirable feed for second reaction zone. In this patent, a third reaction zone reactor is used to preheat the fixed carbon and ash components of the coal prior to feeding into the second zone by contacting the coal with an oxidant to selectively and efficiently oxidize a portion or all the volatile matter to produce gaseous combustion products with high $CO_2/CO$ and $H_2O/H_2$ ratios and efficiently transfer this heat of combustion to the fixed carbon, ash, and any remaining volatile matter in the coal to produce a hot char feed for the second zone of the generic coal-based iron production process. The foregoing has increased the thermally efficiency of the second reaction zone to the point that the thermal efficiency of the first reaction zone limits the overall process efficiency for, at least, some of the generic coal-based iron production processes.

As will be discussed, the present invention provides methods and apparatus to increase the thermal efficiency of the first reaction zone so that even higher thermal efficiencies may be realized than were possible in the prior art. The increase in thermal efficiency can be used to increase throughput.

SUMMARY OF THE INVENTION

The present invention provides a method of smelting iron ore in which the iron ore is introduced into a first reaction zone having a preheat section to preheat the iron ore, thereby to form hot ore and a reduction section to partly reduce said iron ore, thereby to produce partly reduced iron ore also known in the art as direct reduced iron or DRI. The partly reduced iron ore together with hot char and a first oxidant are introduced into a second reaction zone so that said partly reduced iron ore is further reduced and is melted to form a molten iron product and the char is partially oxidized to form a first reducing gas comprising carbon monoxide and hydrogen. The first reducing gas is introduced into the reduction section of said first reaction zone to produce a second reducing gas. A carbonaceous material and a second oxidant are introduced into a third reaction zone. Volatile substances contained within the carbonaceous material are partially oxidized to produce the hot char and a heating gas containing a remainder of the volatile substances. The remainder of the volatile substances contained within the heating gas are oxidized in the presence of a third oxidant to produce heat. At least part of the second reducing gas and the heating gas are introduced into the preheat section of the first reaction zone to preheat the iron ore.

In another aspect, the present invention provides an apparatus for smelting iron ore. The apparatus is provided with a first reaction zone having a preheat section to preheat said iron ore, thereby to form hot ore and a reduction section to partly reduce said iron ore, thereby to produce partly reduced iron ore. A second reaction zone is connected to the first reaction zone so that the second reaction zone receives the partly reduced iron ore and the first reaction zone receives a first reducing gas produced within the first reaction zone. The first reducing gas comprises carbon monoxide and hydrogen to effect the partial reduction of said iron ore and thereby to produce a second reducing gas. The preheat and reducing sections of the first reaction zone connected to one another so that at least part of the second reducing gas is introduced into said preheat section. The second reaction zone is configured to receive a first oxidant and hot char to produce molten iron and the first reducing gas. A third reaction zone is configured to receive a carbonaceous material and a second oxidant to partially oxidize volatile substances contained within the carbonaceous material to produce the hot char and a heating gas containing a remainder of said volatile substances. The third reaction zone is connected to the first reaction zone so that the heating gas is introduced into the preheat section of the first reaction zone and the third reaction zone is also connected to the second reaction zone so that the hot char is introduced thereto. The third reaction zone also has an inlet for receiving a third oxidant to oxidize the remainder of the volatile substances, thereby to create heat for the preheat section of the second reaction zone. Alternatively or in combination with an inlet of the third reaction zone, another inlet may be provided within the first reaction zone, between the preheat and reducing sections, for receiving a third oxidant to oxidize the remainder of said volatile substances contained within the heating gas, thereby to create heat for the preheat section of the second reaction zone.

As in the prior art, volatile substances contained within a carbonaceous substance, for instance coal, are in part oxidized to produce hot char and evolved volatiles. The introduction of the hot char into the first reaction zone, together with the partial oxidation of the char produces the first reducing gas which acts to reduce the incoming partially reduced iron ore. Even though the reduction is endothermic, there still exists enough heat from the oxidation to melt the incoming ore. In the prior art it is this heat is thus the only source for melting the iron ore. In the present invention, however, additional heat is produced from by oxidizing the evolved remaining volatile substances and it is such additional heat that can be used to preheat the ore to increase the overall efficiency of the process. This increase in efficiency can be expressed as an increase in ore throughput.

BRIEF DESCRIPTION OF THE DRAWINGS

While the specification concludes with claims distinctly pointing out the subject matter that Applicant regards as his invention, it is believed the invention will be better understood when taken in connection with the accompanying sole figure which is a schematic of a process in accordance with the present invention.

DETAILED DESCRIPTION

Figure 1:
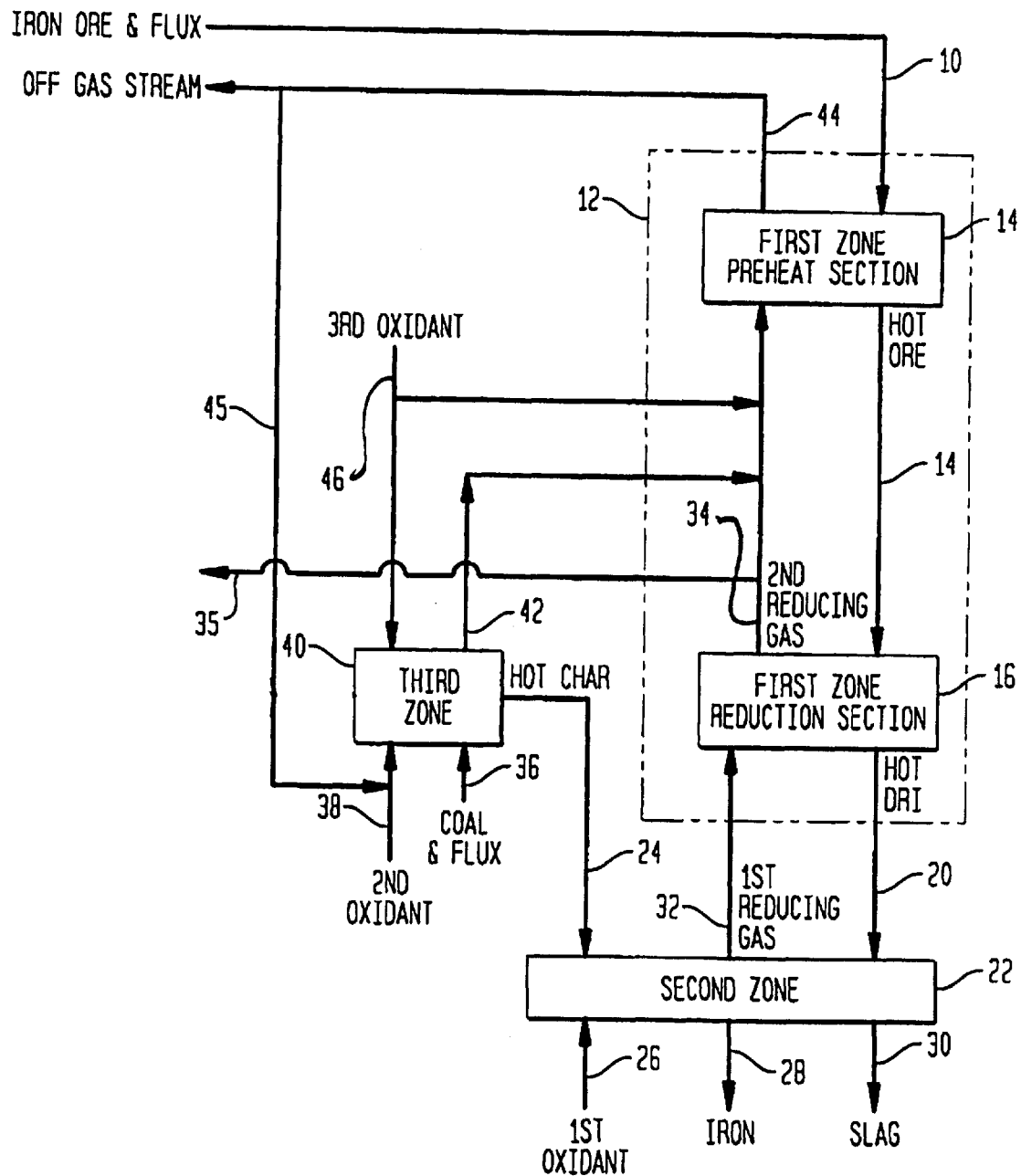

An iron smelting apparatus, as illustrated, represents a modification of the known COREX process developed by Voest-Alpine. The invention is not limited to the particular illustrated process and in fact, as indicated above, could be equally applicable to a broad range of coal-based iron production processes.

Iron ore and a limestone or dolomite flux, designated by reference numeral 10, are introduced into the first reaction zone 12 having a preheat section 14 and a reduction section 16. It is understood that such nomenclature does not act to limit preheat section 14 for only preheat and as such, some reduction will occur with preheat section 14. Similarly, some preheating will also occur within reduction section 16.

As iron ore and flux travel downwardly in preheat and reduction sections 14 and 16 of first reaction zone 12, which can be a reduction shaft reactor of the COREX process, the iron ore is heated and successively reduced from $Fe_2O_3$, $Fe_3O_4$ into FeO and then Fe. Countercurrent to this flow is a first reducing gas and a second reducing gas which is produced by the partial reduction within reduction section 16 of the first reaction zone 12.

The partially reduced iron or DRI which mainly consists of FeO and Fe and which is designated by reference numeral 20 is then introduced into a second reaction zone 22 which can be a melter-gasifier of the COREX process. Additionally hot char 24 and a first oxidant stream 26, which should contain greater than about 70% oxygen, are introduced into second reaction zone 22. As a result, a melted iron product 28 and a slag 30 are produced as well as the first reducing gas which is discharged as a stream 32. This first reducing gas comprises, in the main, carbon monoxide and hydrogen and is thus a more powerful reducing gas than second reducing gas, contained within a stream 34, produced after the reduction occurring within reduction section 16 of the first reaction zone 10. As illustrated, a stream 35 composed of part of the second reducing gas may be exported and as such, only part of the production of second reducing gas may be introduced into preheat section 14 of first reaction zone 12.

Coal and a second oxidant stream, streams 36 and 38, are introduced into a third reaction zone 40, which can be a char reactor, to partially oxidize volatile substances within the coal or other carbonaceous material, thereby to produce hot char (Stream 24), and a heating gas stream 42 comprising carbon dioxide, carbon monoxide, sulfur containing species, small quantities of hydrocarbons, and variable quantities of nitrogen and argon. The exact make-up of heating gas stream 42 will depend on the compositions of the second oxidant stream 38, a recycle stream 45 (discussed hereinafter) and a third oxidant stream 46 (discussed hereinafter). Heating gas stream 42 is created by oxidizing remaining volatile substances in the presence of a third oxidant stream 46 and can be introduced in its entirety into third reaction zone 40 or into preheat section 14 of first reaction zone 12 or as illustrated, split as two subsidiary streams into third reaction zone 40 and preheat section 14. The heat generated by such oxidation is thereby introduced into preheat section 14 of first reaction zone 12 to increase thermal efficiency of the process. The recycle stream 45, which is produced by passage of the second reducing gas (stream 34) and the heating gas stream 42 through preheat section 14 of first reaction zone 12 which can be optionally, but advantageously recirculated in part as a stream 45 back to third reaction zone 40 by a suitable conduit. The degree of recirculation can be controlled by a valve (not illustrated.)

The compositions of the second and third oxidant streams 38 and 46 and the flow rate of stream 45 can be used to control the temperature in the first and third reaction zones 10 and 40 to prevent sintering or particle degradation. The oxidant compositions and the flow rate of recycle stream 45 depend on the coal, iron ore, and flux properties and must be experimentally determined for each combination of feeds. Some limestone and/or dolomite may be advantageously added to the coal feed to produce an appropriate slag in second reaction zone 22 and first reducing gas. Coal stream 36 preferably contains coal with an average particle size in a range from between about 0.1 and about 15 mm, depending on the process requirements of the second zone. Second oxidant stream 38 can be air or air enriched with oxygen. Substantially pure oxygen can be used if stream 45 is present or in the alternative, steam or atomized water are provided. The second oxidant composition of second oxidant stream 38 and the flow rate of recycle stream 45 are set to maintain the temperature of third reaction zone 40 in a range of between about 600 and about 1100° C.

Third reaction zone 40 maybe in a back-mixed fluidized bed, fixed bed, multi-hearth furnace, rotary furnace, or traveling grate gas-solid contactor. The gas-solid contacting can be adjusted by adjusting the bed depth.

The following is a calculated example disclosing an application of the present invention to the illustrated process.

This example presents typical results for conventional prior art process, the same process using the teachings of U.S. Pat. No. 5,613,997 (no Stream 42) and this invention (Stream 42). In this example, the benefits of the teachings in U.S. Pat. No. 5,613,997 are limited by the low temperature (590° C.) of the hot DRI feed. This example illustrates how the heating gas stream 42 can be used to further improve the performance of the process.

Example Summary

| Parameter Description | Parameter Values | | |
|---|---|---|---|
| | Base | No Strm. 42 | Strm. 42 |
| Coal Feed Rate (reference number 36) | | | |
| Flow rate, Kg/MT | 1177 | 880 | 807 |
| Heat Value, GJ/MT | 33.3 | 24.9 | 22.8 |
| 1$^{st}$ Oxidant (Stream 26) | | | |
| Purity, vol % | 100 | 100 | 100 |
| Flow rate, Kg/MT | 1,049 | 731 | 657 |
| Air 2$^{nd}$ Oxidant (Stream 38) | | | |
| O$_2$ flow rate, Kg/MT | 0 | 122 | 112 |
| 1$_{st}$ Reaction Zone 12 | | | |
| Hot DRI (Stream 20) temperature, ° C. | 840 | 590 | 850 |
| % Flux Calcination | 84% | 5% | 77% |
| 3$^{rd}$ Calorific gas | | | |
| Percent export | 100% | 100% | 100% |
| Heat Value, GJ/MT | 15.6 | 7.9 | 6.8 |
| 2$^{nd}$ Reaction Zone 22 | | | |
| Iron & Slag Temperature, ° C. | 1,550°C. | 1,550°C. | 1,550°C. |
| 3$^{rd}$ Reaction Zone 40 | | | |
| Temperature, ° C. | | 900 | 900 |
| % carbon oxidized to CO$_2$ | | 65% | 65% |
| 3$^{rd}$ Oxidant (pure O$_2$) | | | |
| O$_2$ flow rate, Kg/MT | 0 | 0 | 3 |

Kg = Kilogram
MT = Metric ton hot iron product
GJ = giga Joules

Although the present invention has been described with reference to a preferred embodiment, as will occur to those skilled in the art, numerous changes, additions and omissions may be made without departing from the spirit and scope of the present invention.

A comparison of the present invention with the prior art shows a marked increase in the iron production with substantial reductions on the coal and oxygen requirements.

I claim:

1. An apparatus for smelting iron ore comprising:

a first reaction zone having a preheat section to predominately preheat said iron ore, thereby to form hot ore and a reduction section to predominately partly reduce said iron ore, thereby to produce partly reduced iron ore;

a second reaction zone connected to said first reaction zone so that said first reaction zone receives said partly reduced iron ore and said second reaction zone receives a first reducing gas produced within said first reaction zone and comprising carbon monoxide and hydrogen to effect said partial reduction of said iron ore and thereby to produce a second reducing gas;

the preheat and reducing sections of the first reaction zone connected to one another so that at least part of said reducing gas is introduced into said preheat section;

the second reaction zone configured to receive a first oxidant and hot char to produce molten iron and said first reducing gas;

a third reaction zone configured to receive a carbonaceous material and a second oxidant to partially oxidize volatile substances contained within said carbonaceous material to produce said hot char and a heating gas containing a remainder of said volatile substances;

the third reaction zone connected to said first reaction zone so that said heating gas is introduced into said preheat section of said first reaction zone and said third reaction zone also connected to said second reaction zone so that said hot char is introduced thereto; and the third reaction zone also having an inlet for receiving a third oxidant to oxidize said remainder of said volatile substances, thereby to create heat for said preheat section of said second reaction zone.

2. An apparatus for smelting iron ore comprising:

a first reaction zone having a preheat section to predominately preheat said iron ore, thereby to form hot ore and a reduction section to predominately partly reduce said iron ore, thereby to produce partly reduced iron ore;

a second reaction zone connected to said first reaction zone so that said first reaction zone receives said partly reduced iron ore and said second reaction zone receives a first reducing gas produced within said first reaction zone and comprising carbon monoxide and hydrogen to effect said partial reduction of said iron ore and thereby to produce a second reducing gas;

the preheat and reducing sections of the first reaction zone connected to one another so that at least part of said reducing gas is introduced into said preheat section;

the second reaction zone configured to receive a first oxidant and hot char to produce molten iron and said first reducing gas;

a third reaction zone configured to receive a carbonaceous material and a second oxidant to partially oxidize volatile substances contained within said carbonaceous material to produce said hot char and a heating gas containing a remainder of said volatile substances;

the third reaction zone connected to said first reaction zone so that said heating gas is introduced into said preheat section of said first reaction zone and the third reaction zone also connected to said second reaction zone so that said hot char is introduced thereto; and the first reaction zone also having an inlet between said preheat and reducing section for receiving a third oxidant to oxidize said remainder of said volatile substances contained within said heating gas, thereby to create heat for said preheat section of said second reaction zone.

3. The apparatus of claim 2, wherein said third reaction zone also has another inlet for receiving said third oxidant to oxidize said volatile substances within said heating gas.

4. The apparatus of claim 2, wherein said first reaction zone also has another inlet between said preheat and reducing sections thereof for receiving said third oxidant to oxidize said volatile substances within said heating gas.

5. The apparatus of claim 1, or claim 2, or claim 3, or claim 4, further comprising a recirculation conduit communicating between said preheat section of said first reaction zone and said third reaction zone so that part of a recycle stream formed from an effluent produced by passage of said heating gas and said second reducing gas is recirculated back to said third reaction zone.

6. The apparatus of claim 1, or claim 2 or claim 3, or claim 4, wherein:

said first reaction zone comprises a reduction shaft furnace;

said second reaction zone comprises a melter gasifier; and said melter gassifier is connected to said reduction shaft furnace so that said third calorific gas is introduced into an intermediate location thereof, thereby to establish said preheat section above said intermediate location and said reduction section below said intermediate location.

7. The apparatus of claim 6, wherein:

said first reaction zone comprises a reduction shaft furnace;

said second reaction zone comprises a melter gasifier; and said melter gassifier is connected to said reduction shaft furnace so that said third calorific gas is introduced into an intermediate location thereof, thereby to establish said preheat section above said intermediate location and said reduction section below said intermediate location.

* * * * *